Figure 1:
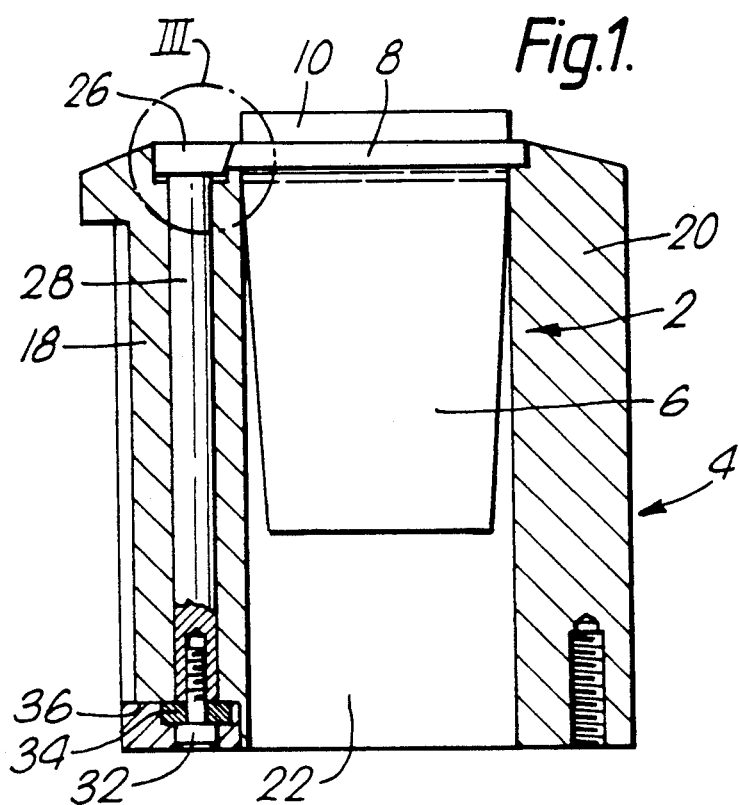

United States Patent [19]

Daines et al.

[11] Patent Number: 5,035,411
[45] Date of Patent: Jul. 30, 1991

[54] FRICTION BONDING APPARATUS

[75] Inventors: John W. Daines; Bryan L. Benn, both of Bristol, England; Walter H. Stoll, Utting, Fed. Rep. of Germany

[73] Assignees: Rolls-Royce plc, London, England; MTU Motoren-und Turbinen-Union Munchen GmbH, Munich, Fed. Rep. of Germany

[21] Appl. No.: 539,212

[22] Filed: Jun. 18, 1990

[30] Foreign Application Priority Data

Jun. 21, 1989 [GB] United Kingdom ............... 8914273

[51] Int. Cl.$^5$ .................. B23K 20/12; B25B 5/00
[52] U.S. Cl. ................................ 269/231; 228/2
[58] Field of Search ............ 228/2, 112; 100/918; 269/231, 234, 287

[56] References Cited

U.S. PATENT DOCUMENTS 4,864,706  9/1989  Jenkel .......................... 29/156.8 B
4,873,751 10/1989  Walker et al. ............... 29/156.8 B
4,884,736 12/1989  Goddard ............................. 228/2

FOREIGN PATENT DOCUMENTS 0290134 11/1988 European Pat. Off. .
2158198  6/1973 France .

Primary Examiner—Richard K. Seidel
Attorney, Agent, or Firm—Oliff & Berridge

[57] ABSTRACT

A delicate or awkward to grip component which is to be friction bonded to another has formed on it a flange or like formation which can be gripped firmly by a wedging action. The component is loaded into a shuttle, provided with a releasable wedge clamp, which is carried by the output drive member of a friction bonding machine. Machine forces for the necessary friction heating and bonding phases of the operation are transmitted to component through faces on the shuttle which abut the component flange.

16 Claims, 3 Drawing Sheets

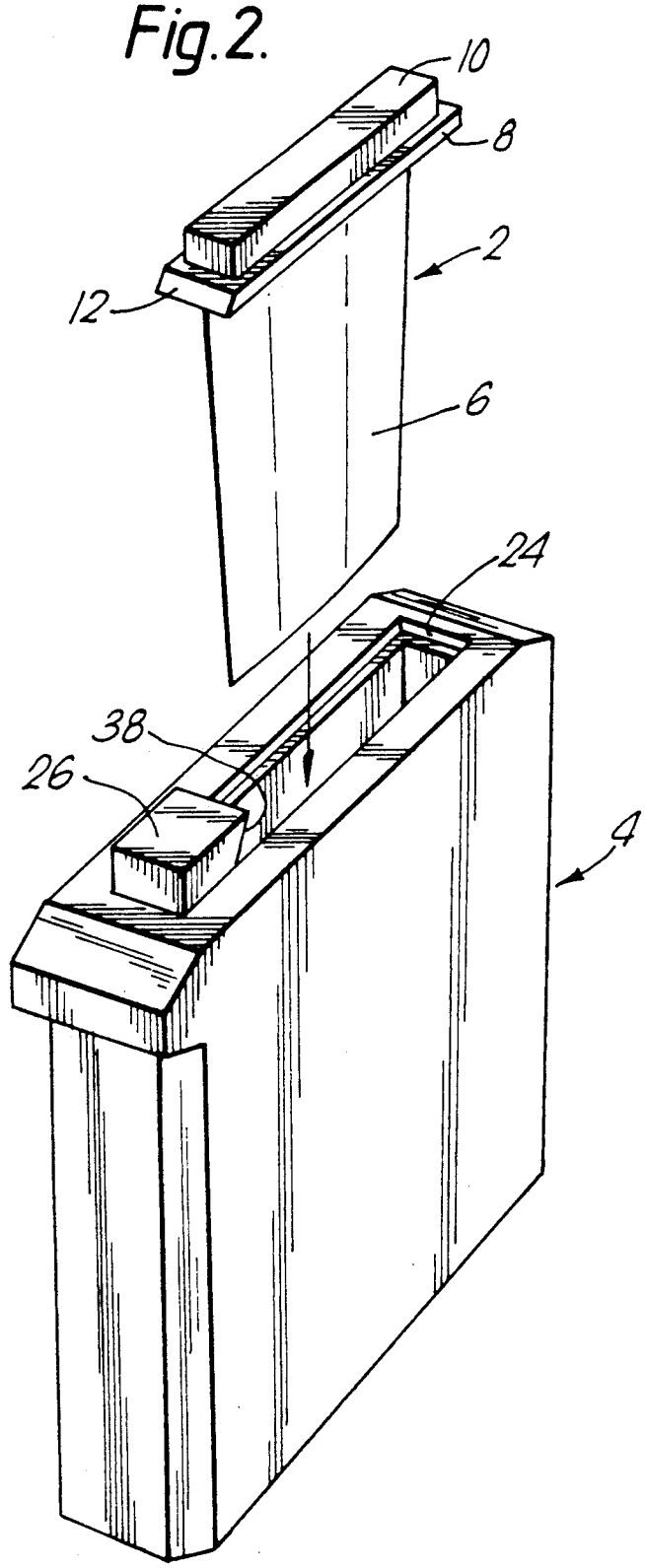

FRICTION BONDING APPARATUS

The invention relates to friction bonding apparatus and particularly concerns a component holder adapted to grip a delicate or awkward component which is to be friction bonded to another.

Basically in friction welding the components to be bonded together are rubbed one against the other so that at their interface sufficient heat is generated by friction sufficient to effect the weld, then a welding force is applied to urge the components into more intimate contact. Initially friction welding was used to join only components having circular symmetry e.g. rods, tubes, shafts and discs etc. and one component is held in a stationary fixture while the other is held in a chuck and spun.

For components lacking in circular symmetry friction bonding has not been available until more recently when machines have been developed which produce irrotational movement of one of the components relative to the other. This irrotational movement may take either of two forms. It may be linear in which case the moving component describes a substantially rectilinear path to-and-fro during the friction heating phase, or it may be an orbital movement in which the moving component follows a closed loop path. The invention may be applied to processes involving either of these two movements.

A joining process of the type just described makes it possible to construct integral assemblies of quite complicated shapes which could not easily be machined from solid if at all. A particular example of this is a bladed disc, or blisk, for a gas turbine engine. A blisk consists of a solid rotor disc with a multiplicity of aerofoil blades disposed at even intervals around the circumference of the disc. By joining individually manufactured components in this way the separate pieces can each possess selected properties or even be formed of different materials, for example a steel disc with nickel alloy blades. It still has to be decided, however, at what stage of the manufacturing process to join the blades to the disc. Whether it is better to join them at a relatively early stage before they are finished and to complete the blade forming process on an assembled blisk, or to join in a finished state. The latter course suffers from the problem that the aerofoil blades are relatively delicate and as the blades are fairly closely spaced there is not much room between them to accommodate the reciprocating drive arm of the welding machine, the invention overcomes this problem.

At its most general, the present invention proposes that in a friction bonding process the driven component shall be held in an intermediate component holder through which the driving forces are transmitted to the component.

According to one aspect of the invention, therefore, friction bonding apparatus for joining a first component to a second component by linear friction bonding includes means for holding a first component relatively motionless and a component holder for holding a second component which is driven irrotationally, the component holder being structured to grip a flange or like formation formed on the second component and having pressure transmitting faces which abut the flange or like to impart to the second component irrotational driving forces to generate frictional heating during the rubbing and bonding phase. In one form of the invention the component holder comprises a shuttle open at one end to partially receive thereinto the second component. Preferably, the margin of the open end of the shuttle is formed with a shoulder which engages with the flange or like formation on the second component to limit penetration thereof into the shuttle.

Figure 3:
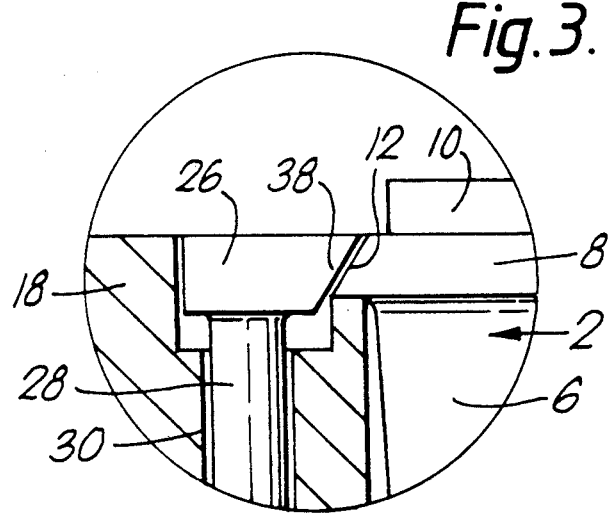
Figure 4:
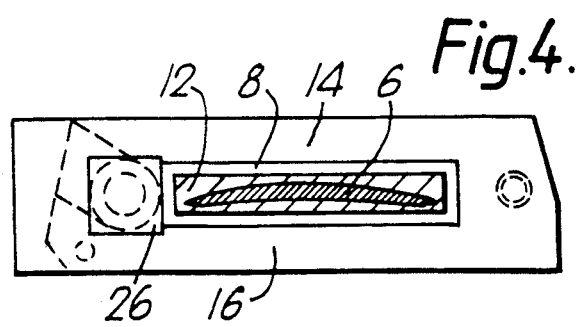
Figure 5:
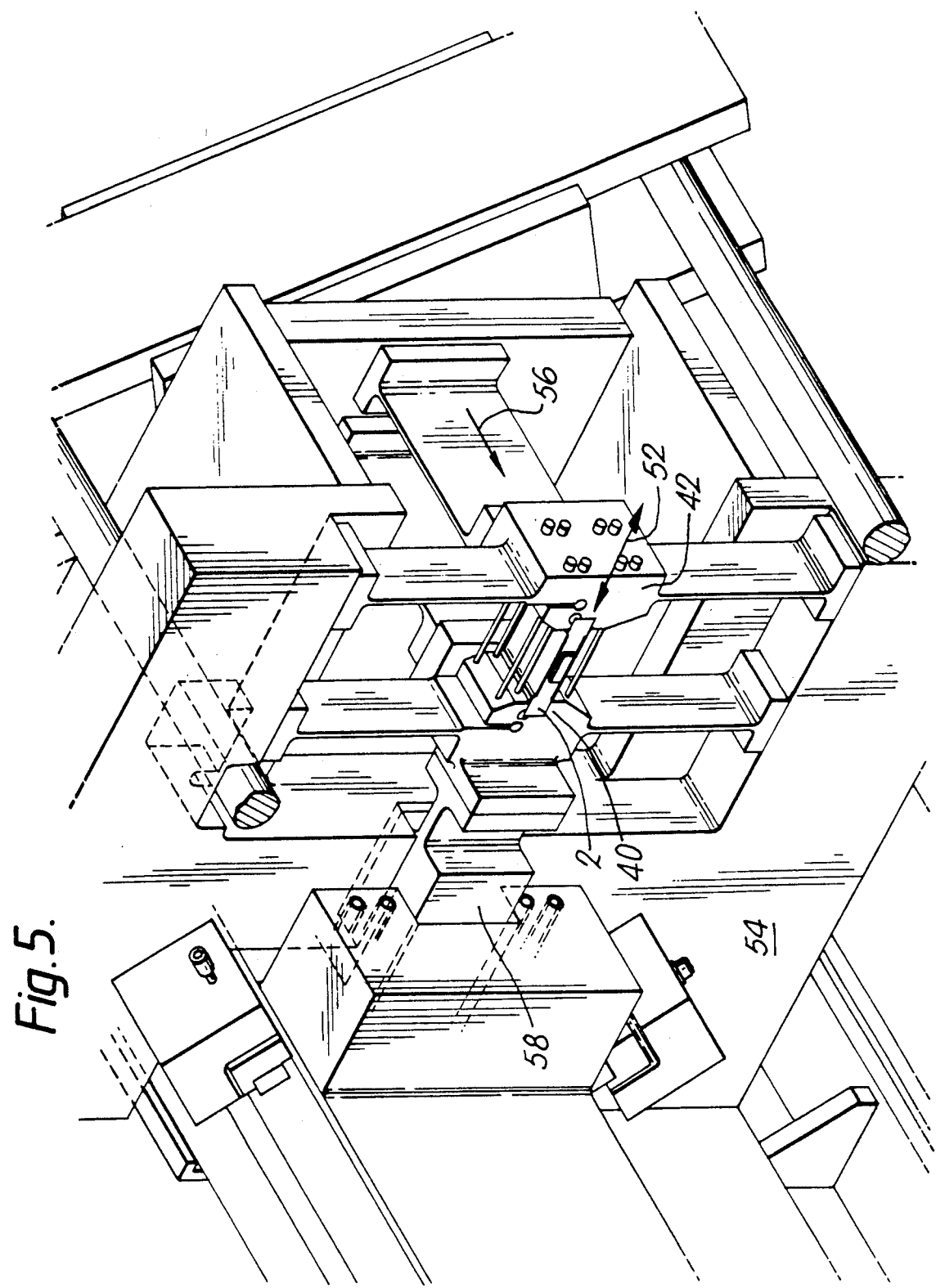

To illustrate how the invention may be carried into practice an embodiment will now be described, by way of example only, with reference to the accompanying drawings, in which:

FIG. 1 is a sectioned side elevation of a shuttle containing a blade ready to be bonded to a blisk, FIG. 2 is a perspective view of the shuttle and a blade about to be inserted into the shuttle, FIG. 3 shows an enlarged detail view of FIG. 1 illustrating the clamping means more clearly, FIG. 4 is a plan view looking down in the view of FIG. 1 towards the end face of the shuttle, and FIG. 5 is a perspective view of part of linear friction bonding machine showing how the shuttle is mounted in the oscillatory head.

Referring now to the drawings, FIGS. 1 and 2 show respectively a sectional view and a perspective view of a component and a component holder for mounting the component in a linear friction welding machine as shown in FIG. 5. In FIG. 1 the component 2, an aerofoil rotor blade for a gas turbine engine, is loaded into the component holder 4 which basically consists of a roughly rectangular metal sleeve. In FIG. 2 the blade 2 is shown separated from the shuttle 4 to reveal more clearly the arrangements for locating and clamping the blade in the shuttle.

The blade 2 has an aerofoil section 6, an end view of which can be seen in FIG. 4, which is formed integrally at the base of the blade with a platform 8 and a stub root section 10. The platform 8 is rectangular in plan view, as can also be seen in FIG. 4, and constitutes a shoulder on four sides surrounding the base of the blade aerofoil 6.

One end preferably planar face 12 of the platform 6 is chamfered towards the root 10, the purpose of which will be described in greater detail below with reference to the enlarged detail view of FIG. 3. The remaining sides of the platform, at least in the example being described, are mutually perpendicular.

The component holder or shuttle 4, as already mentioned, basically consists of a roughly rectangular metal sleeve. It has two relatively large rectangular slab sides 14, 16 the outer faces of which are parallel, the dimensions of which are longer than the height and length of the aerofoil section of blade 2, see FIG. 1. The sides are joined by longitudinal side sections 18, 20 which define the width of the shuttle at a dimension a little wider than the width of the blade platform 8, see FIG. 4. The delicate aerofoil section of the blade is thus fully enclosed within the protective sleeve of the shuttle during the whole of the bonding process thereby reducing the risk of damage.

The external faces of side sections 18, 20 are configured to fit the jaws of a linear friction bonding machine. In the present example these faces are not perpendicular to the slab sides 14, 16. They are, however, shaped to provide abutment surfaces which cooperate with the jaws to ensure correct orientation of the shuttle for joining and to provide positive engagement for the transmission of forces during the bonding process.

The illustrated shuttle 4 was formed from a solid block of metal and formed by drilling and milling with an internal cavity 22 open at both ends to receive the blade 2. The cavity 22 could be formed blind, i.e. open only at one end, as it is intended that the blade 2 shall be mounted in the shuttle sleeve only through one end. The said one end is that shown facing upwards in the view of FIG. 2. At this end the cavity is rectangular in plan and the sleeve is provided with a stepped formation 24 extending along three sides of its inner lip or margin. Rectangular outward facing steps are formed along the two slab sides 14, 16 and one short end 20. The dimensions between opposite faces of the step match the overall dimensions of the platform 8 carried by the blade, so that when the blade is mounted the platform positively engages with the stepped formation 24 to locate the blade with no lateral play.

Clamping means is provided at the other short end 18 of the shuttle instead of a fourth side to the stepped formation. The clamping means comprises a wedge member 26 at one end of long spindle 28 which extends through a hole 30 drilled for the full height of the shuttle to the opposite sides. The remote end of spindle 28 is drilled and internally threaded to receive a clamp screw 32, under the head of which is trapped a washer 34 bearing against a reaction face 36 formed by milling of a recess in the end of portion 18 of the shuttle.

The wedge 26 has three perpendicular sides which are a sliding fit in the rectangular end of the shuttle cavity. The fourth side 38 of the wedge, i.e. the side facing the blade 2, is inclined towards the interior of the shuttle at an angle complementary to the angle of inclination of the end face 12 on the blade platform 8. These inclined faces 12 and 38 bear against each other when the clamp screw 32 is tightened. This action has two effects: one, it tends to force the blade 2 further into the shuttle sleeve thereby urging the aerofoil side of the platform 8 against the outwardly facing surface of the step 24, and second, it generates opposing forces urging the remote vertical end face of the blade platform 8 and the back vertical face of the wedge 26 into abutment with the vertical end walls of the step 24. Thus, the blade 2 is positively clamped in the shuttle 4 with surfaces on the shuttle in abutting relationship with surfaces on the blade so as to be capable of transmitting to the blade forces exerted in perpendicular directions during the rubbing and bonding phases of the joining process.

Turning now to FIG. 5, there is illustrated here the main region of a linear friction bonding machine showing the shuttle 2 mounted in the jaws 40, 42 of the machine. The totality of the machine is not shown in the drawing. It is not necessary to gain an understanding of the invention to explain the complete structure and method of operating the machine. It is sufficient to know that the jaws 40, 42 are mounted on flexible ligaments 44, 46, 48 and 50 for oscillatory movement with two degrees of freedom in longitudinal directions indicated by arrow 52; also that the said jaws and ligaments are supported on a sliding carriage, generally indicated by reference 54 which is capable of being urged in an axial direction denoted by arrow 56.

As will be seen by reference to FIG. 5 the shuttle 4 is held in the jaws 40, 42 so that the longer dimension of the blade platform 8 and the root 10 lie in the direction of arrow 52, and with the end surface of root 10 facing in the direction of arrow 56. Oscillatory or irrotational movement of the blade is produced by ram 58.

In operation of the machine of FIG. 5 in the manufacture of a blisk a blade is first loaded into a shuttle and mounted in the jaws of the machine. The blade is firmly clamped in the shuttle with only the root section 10 protruding beyond the line of the shuttle and jaws. The blisk rotor (not shown) is brought towards the jaws until the site to which the blade is to be bonded is in contact with the exposed root face. The rest or initial position of blade is its median position. At the commencement of the bonding process, that is during the rubbing phase, the oscillatory or irrotational movement is carried out while a relatively light axial force is exerted in the direction of arrow 56. When sufficient heat has been generated in the interface region of the bond, at the contact between the blade root and the rotor disc, movement in the directions of arrow 52 is progressively reduced to zero with the blade returning to rest at the median position. At the same time, however, the axial force in the direction of arrow 56 may be substantially increased for the bonding phase although a constant force can be sustained throughout the operation.

It will be appreciated from this brief description of the operation that forces of several tons are exerted on the blade in different directions during succeeding phases. All of these forces are transmitted to the blade through abutment of the stepped formation in the shuttle with the platform carried by the blade. The forces producing the oscillations of arrow 52 are transmitted between the platform and wedge 26 through the inclined faces 12 and 38 and the abutting vertical side faces of the shuttle step, the platform and the rear face of the wedge. The bonding force is transmitted through the other face of the shuttle step in contact with the aerofoil side faces of the blade platform.

It will be understood that while the invention has been described with reference to blisk manufacture it is not exclusively so concerned and the shuttle may be adapted to accommodate other components which are also difficult to grip and manipulate during working processes and which have to be protected against the risk of damage.

We claim:

1. An assembly comprising a component holder and a component, the component holder open at one end for holding the component, the component having flange means formed thereon, the component holder comprising:

abutment means adapted for abutting the flange means of the component and for limiting penetration of the component into the component holder, gripping means for gripping the flange means, and pressure transmitting faces which abut the flange means of the component for imparting irrotational driving forces to generate frictional heating for welding and to exert constant pressure during bonding of the component, wherein the flange means is provided with an inclined face and the component holder is provided with a releasable clamping means including a wedge member having a face inclined towards the component at an angle complementary to the angle of inclination of said inclined face of the flange means and adapted to bear against said inclined face when clamped so as to positively clamp the component in the component holder against the abutment means.

2. The assembly according to claim 1 wherein the component holder comprises a shuttle open at one end to partially receive thereinto the component.

3. The assembly according to claim 2 wherein the abutment means is provided by a stepped formation within the margin of the open end of the shuttle.

4. The assembly according to claim 3 wherein the stepped formation is formed by said pressure transmitting faces which abut the component flange means to transmit the frictional heating and contact forces.

5. The assembly according to claim 1 wherein the releasable clamping means is disposed to one side of the open end of the shuttle.

6. The assembly according to claim 5 wherein the releasable clamping means comprises a screw clamp.

7. Friction bonding apparatus according to claim 6 wherein the screw clamp is provided with means for tightening and releasing the screw clamp from the end of the component holder opposite to said open end.

8. The assembly according to claim 1 wherein the component holder is adapted to be carried by the output drive member of a friction bonding machine.

9. An assembly comprising a component holder and a component, the component holder open at one end for holding a component;
   the component having flange means formed therein and the component holder comprising means for retaining the component, wherein the retaining means comprises a wedging means;
   the component holder being structured to grip the flange means of the component and having pressure transmitting faces which abut the flange means for imparting irrotational driving forces to the component to generate frictional heating for welding and to exert contact pressure for bonding of the component.

10. The assembly according to claim 9 wherein the component holder comprises a shuttle open at one end to partially receive thereinto the component.

11. The assembly according to claim 10 wherein the margin of the open end of the shuttle is formed with a shoulder which engages with the flange means on the component to limit penetration thereof into the shuttle.

12. The assembly according to claim 11 wherein the shoulder is formed by pressure transmitting faces which abut the flange means to transmit the frictional heating and contact forces.

13. The assembly according to claim 9 wherein the wedging means comprises a releasable member disposed to one side of the open end of the component holder.

14. The assembly according to claim 13 wherein the releasable member comprises a screw clamp.

15. The assembly according to claim 14 wherein the screw clamp includes means for tightening and releasing the screw clamp located at an end of the component holder opposite to said open end.

16. The assembly according to claim 9 wherein the component holder is adapted to be carried by the output drive member of a friction bonding machine.

* * * * *